March 10, 1953 M. SKOLLER 2,631,277
FLIGHT HAZARD WARNING SYSTEM
Filed Sept. 2, 1947
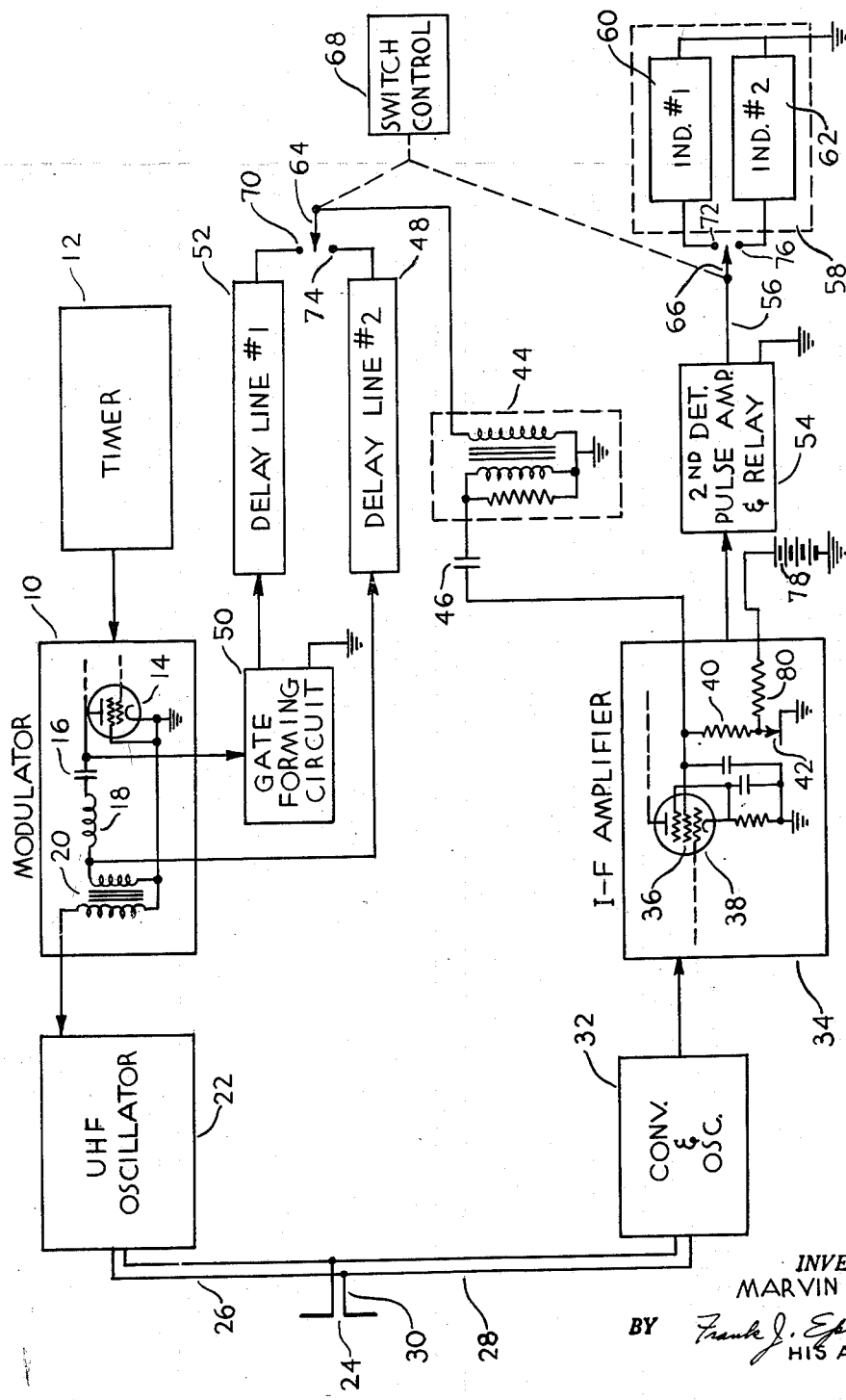
INVENTOR.
MARVIN SKOLLER
BY Frank J. Epstein
HIS AGENT

UNITED STATES PATENT OFFICE 2,631,277

FLIGHT HAZARD WARNING SYSTEM

Marvin Skoller, Los Angeles, Calif., assignor to Hughes Tool Company, Houston, Tex., a corporation of Delaware Application September 2, 1947, Serial No. 771,597

8 Claims. (Cl. 343—13)

This invention relates to obstacle detection equipment and in particular to a radio-echo apparatus for use on aircraft to provide warning of the near presence of flight hazards.

A major proportion of aircraft mishaps are attributable to a combination of off-course flight, the presence of flight hazards, and either poor visibility conditions or a lack of alertness on the part of the aircraft pilot. In particular, there has been an alarming increase in the number of aircraft crashes taking place against mountains at distances no more than several hundred feet below their peaks, crashes which appear to be readily avoidable if some advance warning can be obtained.

It is therefore an object of the present invention to provide an obstacle detection apparatus for aircraft, which functions under all weather and visibility conditions to give visual and audible warning of the near presence of flight hazards.

Another object is to provide a warning apparatus, for aircraft, in which a warning indicator or alarm is energized when the clearance or separation distance of the aircraft from underlying or advance terrain, or from any obstacle in the general region of the aircraft, decreases to a preset value.

Another object is to provide a warning system, for aircraft, which produces a first warning indication or alarm when the aircraft enters a hazard zone, and which produces an additional warning indication or alarm when the hazard distance shortens to less than a pre-set value.

Another object is to provide an electronic apparatus functioning to give warning of rapidly rising ground which generally precedes mountainous terrain.

A further object of the present invention is to provide an improved radio pulse-echo apparatus having means to check the apparatus as to operativeness.

Other objects, features and advantages of the invention will appear from the following description taken in connection with the accompanying drawing in which the single figure is a diagram of a preferred embodiment of the invention.

The invention will be described with particular reference to a system of the radio pulse-echo type, in which search pulses of high frequency energy are generated and radiated into a selected region, resultant echo pulses are received, and the short time intervals between corresponding search and echo pulses are in effect measured and utilized to indicate the separation distances between the apparatus and the reflection producing bodies.

Referring then to the single figure of the drawing, there is shown in circuit and block diagram form a complete radio pulse-echo system embodying the invention. The transmitter portion of this system includes a modulator 10 which forms modulating pulses at a repetition frequency and instants determined by timer 12. Timer 12 may be of blocking oscillator type and designed for operation at say 400 cycles per second. Modulator 10 includes a gaseous grid-controlled tube 14, commercially known as a thyratron, which "flashes" or "fires" once per cycle of voltage furnished by timer 12, and effectively presents a short circuit between its cathode and plate at such instants. The resultant sharp fall in voltage causes a pulse to be generated by a highly damped tuned circuit comprising capacitor 16, inductance 18 and pulse transformer 20, serially connected in the stated order between the plate and cathode of thyratron 14. The charge built up in capacitor 16 in the period preceding the firing of thyratron 14 is in effect suddenly applied to this tuned circuit, and the resultant pulse generated across the secondary of pulse transformer 20 is of large amplitude and brief duration, determined by the constants of the tuned circuit. Modulator 10 may, for example, be designed to deliver a pulse of approximately 0.4 micro-second duration, satisfactory for radio-echo purposes and suitably narrow for a short range warning gate as later described.

Ultra-high-frequency oscillator 22 is energized by or modulated in accordance with the modulator pulses, and the corresponding search pulses or bursts of ultra-high-frequency energy are radiated by an antenna 24. The same antenna may also serve for the receiver, as shown, by the use of suitable matching sections 26 and 28 connecting the ultra-high-frequency oscillator 22 and the input stage of the receiver, respectively, to antenna transmission line 30. Any other means for duplexing may be utilized, or, if preferred, separate antennas for the receiver and transmitter may be provided. The antenna system may be designed and mounted to have a broad pattern which covers not only those hazard regions in the immediate flight path of the aircraft but also below and to the sides. The advantage of such a field pattern is that warning of head-on and other hazards are available regardless of the aircraft attitude or course of flight. While here shown schematically as a dipole, the antenna may take any other desired form which provides sufficient radiation in the stated directions to cover the hazard regions.

Echo pulses, reflected from objects within the radiation field of the antenna and picked up by the pulse receiver, are converted to an intermediate frequency signal by a first detector and local oscillator 32, and applied to an intermediate frequency amplifier 34 utilizing screen grid tubes. One or more of these screen grid tubes are maintained in blocked condition except during certain brief intervals. For example, screen grid 36 of intermediate frequency tube 38 may be normally held substantially at ground or cathode potential by returning it to ground through a resistor 40 and a normally closed checker switch 42, as shown. Gate pulses, having the necessary durations and time-positions relative to corresponding search pulses, are applied through a gate pulse transformer 44 and a capacitor 46 to screen grid 36. Intermediate frequency tube 38 is thus normally blocked, but momentarily and periodically enabled to pass and amplify echo pulses received during the existence of applied gate pulses. The gate pulse for short range warning is here obtained directly from the modulator circuit 10, departing from the conventional practice which necessitates a separate gate forming circuit and its shock excitation or triggering by timer 12, modulator thyratron 14 or any other facility especially provided for such purpose. In the exemplary embodiment of the present invention, the extremely narrow modulating pulse formed by modulator 10 and appearing at the primary or pulse transformer 20 is suitably retarded by delay line 48 for utilization as a short range gate. For example, where it is desired that the warning indicator, later described, shall be energized when the aircraft bearing the equipment comes within 500 feet of an echo-producing hazard, a total time span of substantially one microsecond between initiation of a search pulse and completion of a corresponding gate pulse is required. Assuming ideal straight-sided pulses, the modulator and search pulses should be just under 0.5 micro-second in time-length, and the range gate pulses should be delayed by an amount slightly greater than the search pulse time-length, in order to prevent continuously energizing the indicator due to overlapping of the search pulse and the gate pulse. In a practical case where the search and gate pulses are not straight-sided, a distinct 500 foot warning may still be provided by making the modulation pulse narrower, say substantially 0.4 micro-second in time-length, and delaying it sufficiently to again provide a total time span of substantially one micro-second between initiation of a search pulse and termination of a corresponding gate pulse. Additional gate pulses for greater ranges may be provided in a similar manner, or by means of one or more gate-forming circuits 50 and associated delay lines 52 connected between gate pulse transformer 44 and the plate of thyratron 14. While but two range gate circuits are here shown, utilized as later described, it is to be understood that as many range gates may be provided as desired, and that the range gates may be either contiguous or overlapping. It is noted that the circuits which respectively include delay lines 48 and 52 are both circuits responsive to the search signals for developing gate signals delayed a predetermined time interval after the search signals.

The second detector, pulse amplifier and relay switch means indicated as a block at 54 are conventional in their circuitry, and function as an indicator control or energizing means, applying an energizing voltage through output lead 56 to an indicator circuit 58 during the time that echo pulses are passed by intermediate frequency amplifier 34. Indicator circuit 58 comprises several units corresponding in number to the several ranges provided in the apparatus. Each indicator unit may have a warning light, a warning buzzer, or both, to attract immediate attention of the aircraft pilot whenever hazards in the selected ranges reflect echo pulses to the equipment. The warning alarm ranges may be readily identified without close attention of the operator or pilot by providing brilliant warning lights of different colors, buzzers or other audible alarms of different tones, or any other warning indicators of distinctive and attention provoking character.

The contiguous or overlapping range gates are in the illustrated embodiment applied automatically and in repetitive sequence to gate pulse transformer 44, and the warning indicator units are correspondingly intermittently connected to output lead 56. Any suitable electronic or electro-mechanical means may be provided for this purpose. For example, where but two range gate circuits and corresponding indicator units 60 and 62 are provided, as shown, a double-pole double-throw switch arrangement may be used, in which movable points 64 and 66 are caused to alternately contact corresponding pairs of stationary points. The switch may be actuated by means of a small motor, gear train and cam, here represented by the switch control block 68, causing movable points 64 and 66 to alternately dwell first against stationary contacts 70 and 72, respectively, and then against stationary contacts 74 and 76, respectively. During the first stated dwell condition, indicator unit 60 is connected to the relay switch circuit of unit 54 while a series of relatively long range gate pulses shaped by gate forming circuit 50 and suitably retarded by delay line 52 are applied to intermediate frequency amplifier 34. During the other stated dwell period, indicator unit 62 is connected to the relay switch circuit while a series of short range gate pulses are applied to the intermediate frequency amplifier. Discrete warnings for both the long and short ranges are thus available without the necessity of manual range selection. It is to be understood, however, that the apparatus may be designed to have as many or as few ranges as desired, although two ranges as here shown and described are believed to be particularly suitable, and that a non-automatic, manual, range selection switch and a single warning indicator unit may be provided for less versatile, lighter weight equipment.

When the aircraft bearing the described warning apparatus enters an outer hazard zone, the longer range indicator unit 60 is intermittently energized, causing blinking action of the warning light or comparable action of any other form of warning indicator unit utilized. When the hazard distance shortens to less than a pre-set value, indicator unit 62 also is intermittently energized in the same manner. In addition to presenting hazard warnings over several ranges, the described system thus also functions to enhance the attention demanding character of the warning alarms when overlapping range gates are employed.

The operation of the equipment may be checked at any time by means of the checking circuit shown in intermediate frequency amplifier block 34. A checking voltage source, such as a battery 78, has its positive terminal by-passed through a bleeder resistor 80 to ground during the normally closed condition of checker switch 42. By throwing checker switch 42 to an open position, the junction of resistors 40 and 80 is disconnected from ground and the checking voltage is applied to screen grid 36, enabling the intermediate frequency amplifier to pass and amplify the small amplitude search pulses which leak through to the input circuit of the receiver, and causing indicator units 60 and 62 to be energized in normal fashion. Improper operation or failure of the equipment, generally traceable to defective tubes, is thus readily and instantaneously detectable under flight conditions.

The hazard distances at which warnings are given are, of course, a matter of design, being dependent upon the duration and time-position of the range gate pulses relative to corresponding search pulses. The gate pulse circuits may, for example, be designed to provide an initial warning at a distance of 2000 feet, and an additional warning at a distance of 500 feet, warning distances which have been found suitable for operation over most terrain. For example, an extensive survey of terrain in the vicinity of airline routes indicates that high mountain peaks are always surrounded by a more or less gradual rise in the terrain such that, for an aircraft flying as much as one thousand feet below the peaks, the 2000 foot warning indicator unit will be energized generally at least several miles in advance, affording ample time for the aircraft to clear it even by a blind climbing maneuver. The 500 foot warning is particularly useful during aircraft let-down operations.

While the invention has here been illustrated in an embodiment which requires the pilot to manually control the aircraft to evade a hazard of which warning is given, the invention may also be employed with an aircraft having automatic pilot means for controlling its flight path. Such an autopilot may readily be designed to cause the aircraft to execute a hazard-evading maneuver, for example a climb at an initially high and gradualy decreasing rate, in response to the energizing voltage produced at output lead 56 when the aircraft is in a hazard zone.

It will be understood that the particular embodiments of the invention here described have been chosen only by way of example, and that numerous modifications of the system components and changes in their combination and arrangement may be resorted to without departing from the spirit and scope of the invention. I therefore contemplate by the appended claims to cover any such modifications as fall within the true spirit and scope of the invention.

I claim as my invention:

1. In combination with a pulse-echo system including a search-pulse transmitter, an echo-pulse receiver, pulse radiating and pickup means for said transmitter and receiver, and gating means rendering said echo-pulse receiver operative during selected intervals to amplify and utilize echo-pulses, a checking circuit comprising a source of direct-current potential, and means coupled between said source and said receiver for selectively applying the potential from said source to said receiver to render said echo-pulse receiver continuously operative to amplify and utilize directly received search pulses.

2. In combination with a circuit including a thermionic tube having a control element normally maintained at a selected potential, said circuit having means applying gating pulses to said control element to change the potential thereon to a given value during gating pulse application, a checking circuit comprising a source of potential, and means coupled between said source and said control element for selectively applying a continuous voltage of said value to said control element.

3. A hazard warning system comprising a transmitter for transmitting periodic search signals; receiving means for receiving echo signals reflected from objects encountered by said search signals, said receiving means including an output stage and a normally blocked amplifier stage; first and second gate signal generating circuits coupled to said transmitter and responsive to each of said search signals for developing first and second gate signals, respectively, each of said circuits including a delay line of a predetermined time-delay characteristic; first switching means alternately coupling each of said generating circuits to said amplifier stage for a predetermined multiple number of periods of said search signals for applying said gate signals to said amplifier stage to unblock said amplifier stage; first and second indicating means; second switching means alternately coupling each of said indicating means to the output stage of said receiving means for said predetermined multiple number of periods; and switch control means coupled to said first and second switching means for simultaneously actuating said first and second switching means whereby said first and second gate generating circuits are coupled to said amplifier stage when said first and second indicating means are coupled to said output stage, respectively.

4. A hazard warning system comprising a transmitter for transmitting periodic search signals; a receiver for receiving echo signals reflected from objects encountered by said search signals, said receiver including an output stage and a normally blocked amplifier stage; first and second gate signal generating circuits coupled to said transmitter, each of said circuits being responsive to each of said search signals for developing a gate signal delayed a predetermined time interval after said search signal; first and second indicators; and switching means for alternately applying the gate signals from said gate generating circuits to said amplifier stage for a predetermined multiple number of periods of said search signal to unblock said amplifier stage, and for simultaneously alternately connecting each of said indicators to said output stage for said predetermined multiple number of periods.

5. A hazard warning system comprising a transmitter for transmitting search signals; a receiver for receiving echo signals reflected from objects encountered by said search signals, said receiver including input and output stages and being normally inoperative to pass signals received at said input stage to said output stage; first and second gate signal developing circuits coupled to said transmitter, said circuits being responsive to each of said search signals for developing gate signals delayed different predetermined time intervals after each search signal, respectively; first and second indicators; and switching means coupled between said gate circuits and said receiver for alternately applying the gate signals from said gate circuits to said receiver to render said receiver operative, said switching means including means coupled between said indicators and said output stage of said receiver for simultaneously alternately connecting said indicators to said output stage; said gate signal circuits including means for producing first and second signals in the two circuits respectively corresponding to first and second limited ranges which have at least one point in common.

6. A hazard warning system comprising a transmitter for transmitting periodic search signals; a receiver for receiving said search signals after reflection from an object, said receiver including input and output stages and being normally inoperative to pass signals received at said input stage to said output stage; at least first and second indicators for providing signals representative of the presence of objects within first and second predetermined ranges of said transmitter, respectively, at least one point in said second range coinciding with a point in said first range; at least first and second gate signal generating circuits coupled to said transmitter, each of said circuits being responsive to said search signals for generating delayed periodic gate signals, the delays introduced by said circuits corresponding, respectively, to the transit times of said search signal to and from an object located at the nearest point of said first and second predetermined ranges; and switching means coupled between said gate circuits and said receiver for sequentially applying the gate signals from said gate circuits to said receiver to render said receiver operative, said switching means including means for simultaneously sequentially connecting said indicators to said output stage of said receiver whereby each indicator is connected to said output stage during the interval that the gate signals from its respective gate circuit are applied to said receiver.

7. A hazard warning system as defined in claim 6 wherein the period during which each of said gate signals is applied to said receiver is a multiple of the period of said transmitter.

8. In a hazard warning system for indicating the presence of objects within at least first and second predetermined ranges, said system including means for transmitting periodic search signals, a receiver comprising: an input stage; an output stage; a normally blocked stage coupled between said input and output stages; at least first and second indicators, one for each range; at least first and second circuits responsive to the search signals for developing delayed periodic gate signals, the delays introduced by said first and second circuits corresponding, respectively, to the transit times of a search signal to and from an object located at the nearest point of said first and second predetermined ranges; a first switch for sequentially connecting said circuits to said normally blocked stage to apply the gate signals to said normally blocked stage to unlock said stage; a second switch for sequentially connecting said indicators to said output stage; and switch control means coupled to said first and second switches for simultaneously actuating said switches; the means for transmitting periodic search signals and for developing delayed periodic gate signals therefrom including means for delaying the beginning of the second delayed periodic gate signal to a time instant no later than the instant of termination of the first periodic gate signal and terminating the second signal after the termination of the first signal and prior to the transmission of the next search signal.

MARVIN SKOLLER.

REFERENCES CITED

The following references are of record in the file of this patent:

UNITED STATES PATENTS

| Number | Name | Date |
|---|---|---|
| 1,794,690 | Horni | Mar. 3, 1931 |
| 2,216,575 | Seinfeld et al. | Oct. 1, 1940 |
| 2,266,410 | Busignies | Dec. 16, 1940 |
| 2,225,046 | Hunter | Dec. 17, 1940 |
| 2,462,856 | Ginzton | Mar. 1, 1943 |
| 2,403,527 | Hershberger | July 9, 1946 |
| 2,403,755 | Rankin | July 9, 1946 |
| 2,406,316 | Blumlein | Aug. 27, 1946 |
| 2,416,088 | Deerhake | Feb. 18, 1947 |
| 2,422,134 | Sanders | June 10, 1947 |
| 2,433,681 | Blumlein | Dec. 30, 1947 |
| 2,436,672 | Sanders | Feb. 24, 1948 |
| 2,455,673 | Hansell | Dec. 7, 1948 |
| 2,457,393 | Muffly | Dec. 28, 1948 |
| 2,468,083 | Labin | Apr. 26, 1949 |
| 2,476,301 | Jenks | July 19, 1949 |
| 2,477,567 | Barker | Aug. 2, 1949 |
| 2,489,202 | Selinger | Nov. 22, 1949 |
| 2,490,268 | Herbst | Dec. 6, 1949 |
| 2,495,780 | Shepherd | Jan. 31, 1950 |
| 2,499,349 | Ayres | Mar. 7, 1950 |